United States Patent Office 3,443,777
Patented May 13, 1969

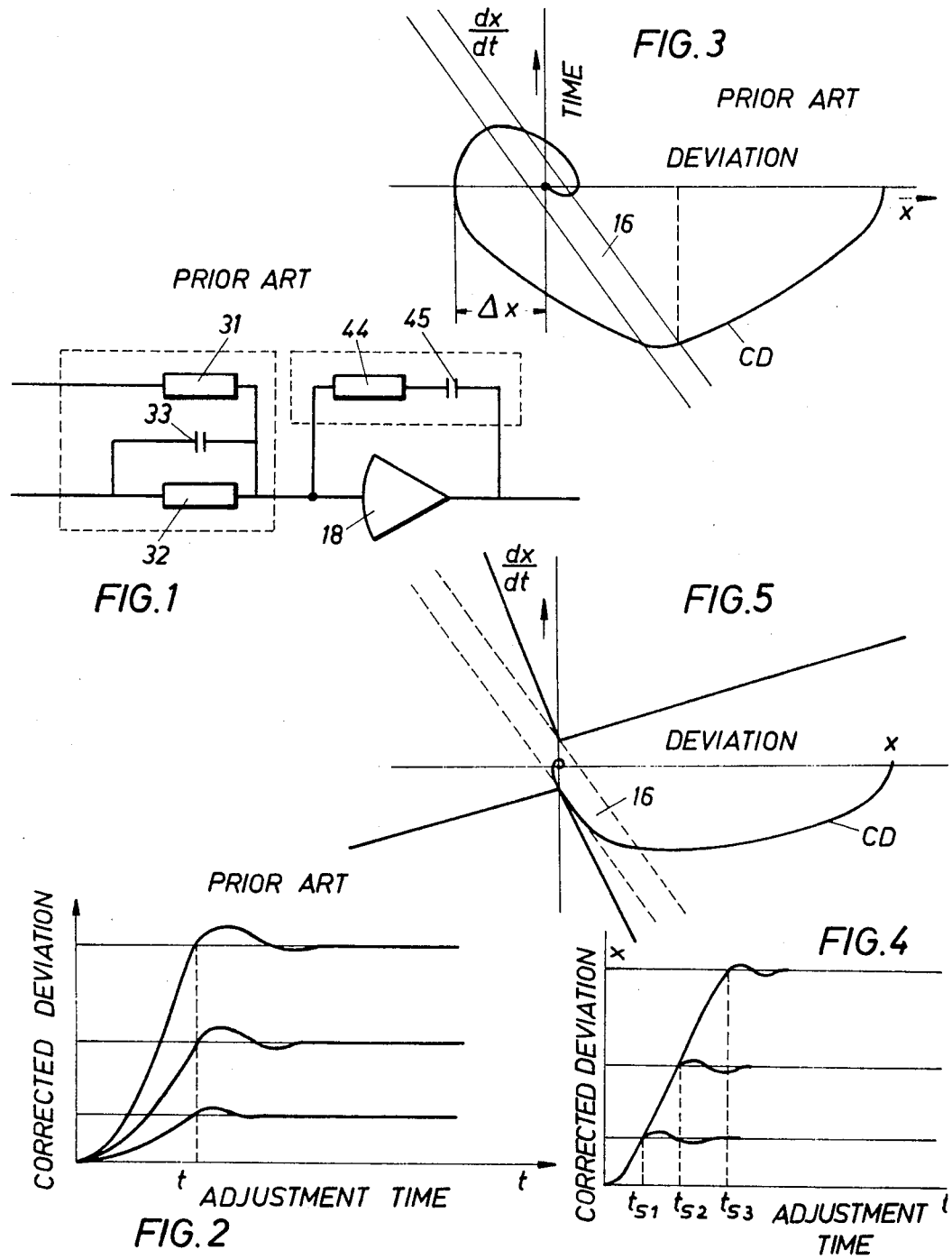

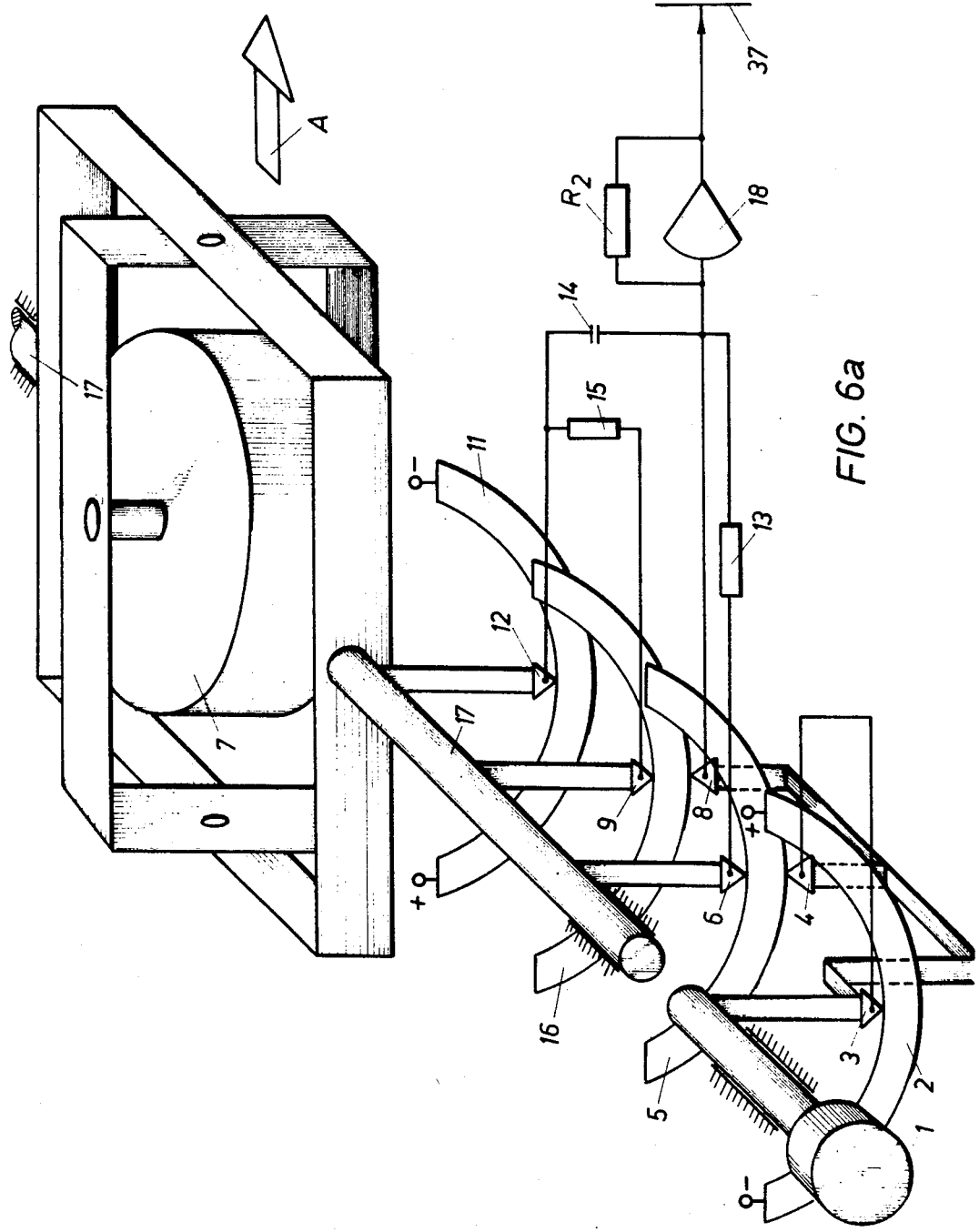

3,443,777
REGULATING ARRANGEMENT FOR AIRCRAFT
Werner Sobotta, Bremen-Vahr, Germany, assignor to Vereinigte Flugtechnische Werke G.m.b.H., Bremen, Germany
Filed Apr. 4, 1967, Ser. No. 628,421
Claims priority, application Germany, Apr. 6, 1966, V 30,808
Int. Cl. B64c *17/06, 13/50, 13/18*
U.S. Cl. 244—77                              11 Claims

ABSTRACT OF THE DISCLOSURE

Deviations of an aircraft from a desired position selected by the pilot, are corrected by a regulating arrangement including a variable resistor having taps respectively controlled by the pilot and by a gyroscope part which responds to the deviation of the aircraft.

Background of the invention

It is known to correct deviations of aircraft from a desired position, for example roll and pitch movements, by regulators employing the so-called operator amplifier principle. High gain electronic amplifiers are used which employ input and return impedances to control the regulation of the aircraft over a time period.

Regulating arrangements according to the prior art operate according to a linear function which means that the regulating function can be represented by a linear differential equation having constant coefficients. This is due to the fact that the input and return impedances of the prior art are constant resistors and capacitors. Regulation according to a linear function has the following disadvantages:

(a) The correction of a comparatively small deviation of the position of the aircraft, or other regulated value, requires the same time as the correction of a great deviation.

(b) The aircraft having limited steering moments overswings when substantial deviations are regulated and corrected due to the fact that the control surface, for example, the rudder, is in an end position during the greater part of the regulating operation.

(c) The selection of a regulating amplification which, in certan cases, controls the remaining deviation of the aircraft, is determined by the time available for the correction of the deviation, particularly if a proportional differential regulator circuit is used.

Summary of the invention

It is one object of the invention to overcome the disadvantages of known regulating arrangements for correcting the position of an aircraft.

Another object of the invention is to provide a regulating arrangement in which different deviations of an aircraft from a desired position are corrected in proportionate time periods so that small deviations are rapidly corrected.

Another object of the invention is to provide the regulating arrangement in which overswinging of the aircraft beyond a desired position is prevented, and a deviation is fully corrected.

This is obtained in accordance with the invention by varying the input and/or return impedances of an operational amplifier depending on the deviation of the aircraft from its desired position or on the corresponding position of a control element regulating the position of the aircraft, for example, the rudder angle or rudder speed. The impedance is varied in such a manner that the time required for the correction of the deviation depends on the deviation which is corrected. In accordance with the invention, the means by which the control surface, for example the rudder, is adjusted, operates substantially within a linear range, and the amplification can be adjusted to any desired high value in the range of deviations approaching zero so that the deviation can be fully compensated.

One embodiment of the invention comprises setting means, for example a servo motor, for adjusting the position of a control element controlling the position of the aircraft, for example a rudder or aileron in an aircraft, or airbleed nozzles in a satellite; amplifier means having input means for receiving a command signal representing a resired position of the aircraft and a signal representing the actual position of the aircraft output means for transmitting a regulating signal to the servo motor of the setting means, and impedance means preferably including constant and variable resistors; first regulating means for varying the resistor and for transmitting the command signals to the input means; and second regulating means responsive to a deviation of the aircraft from the desired position to vary the resistor. The regulating signals cause the setting means to adjust the control element to the respective control position within a time period depending on the amount of the deviation to be corrected.

The servo motor of the setting means may be an electric or hydraulic motor having a mechanical output and an electric input and being constructed so that the mechanical displacement of the output member of the servo motor is proportional to the value of the electric input signal.

The term "deviation" includes deviations of an aircraft from its intended course, and also angular displacement of the aircraft due to roll, pitch, or yaw movements.

In the preferred embodiments of the invention, a resistor has at least two movable taps, one of which is shifted to represent the desired position of the aircraft. The other tap is preferably controlled by a gyroscope part representing the actual position of the aircraft. For example, the cardan shaft of a gyroscope may carry the tap.

In this manner, the regulating parameters are influenced depending on the difference between a desired position and the actual position of the aircraft.

One movable tap is controlled by the gyroscope and represents the actual position of the aircraft and its deviation from the desired position, while the other tap, which represents the desired position of the aircraft is mechanically connected with the source of command signals so that its position represents the momentary desired position of the aircraft. At least one variable tap for the command signal, and one variable tap for the gyroscope signal must be provided.

The above-explained arrangement is particularly suited for a so-called "PD regulator" which uses proportional part P and a differentiated part D of the value to be regulated for regulating the same. For example, for regulating a course of an aircraft, the course angle and the differential of the course, namely the rotary speed, in the regulator is used for controlling the operation of the rudder. The differentiated part D is generally used for dampening the regulating operation.

A modified arrangement of the present invention is concerned with the so-called "PID regulator," which in addition to the above-described functions of a "PD regulator" also forms the integral I of the regulated value. In this manner, the result is obtained that even if a continuous disturbance prevails, the deviation is corrected to zero, for example, if an engine of a two-engine aircraft fails, a regulator can guide the aircraft to the desired course due to the integral part I.

If a PID regulator is used, a variable resistor is provided with a pair of movable taps connected in parallel and in contact with spaced portions of the resistor. This double tap is controlled by the gyroscope part of the second regulating means. The variable voltage division is obtained by a constant resistor and the variable resistor on which the taps are provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

*Brief description of the drawing*

FIG. 1 is a diagram illustrating a PID regulator according to the prior art;

FIG. 2 is a diagram graphically illustrating the times required for the correction of different deviations by the prior art arrangement shown in FIG. 1;

FIG. 3 is a diagram graphically illustrating the overswinging and overcorrection produced by a regulator according to FIG. 1 in aircraft whose control elements are adjustable between given limits;

FIG. 4 is a diagram graphically illustrating the times required by the arrangement of the invention for correcting different deviations;

FIG. 5 is a diagram graphically illustrating the correction of a deviation by the arrangement of the present invention, and the limits between linear and non-linear ranges of operation of the setting means when the impedance is continuously varied in accordance with the invention;

FIG. 6a is partly a perspective view and partly a diagram illustrating the mechanical construction of the embodiment of FIG. 6;

*Description of the preferred embodiments*

Figure 6:
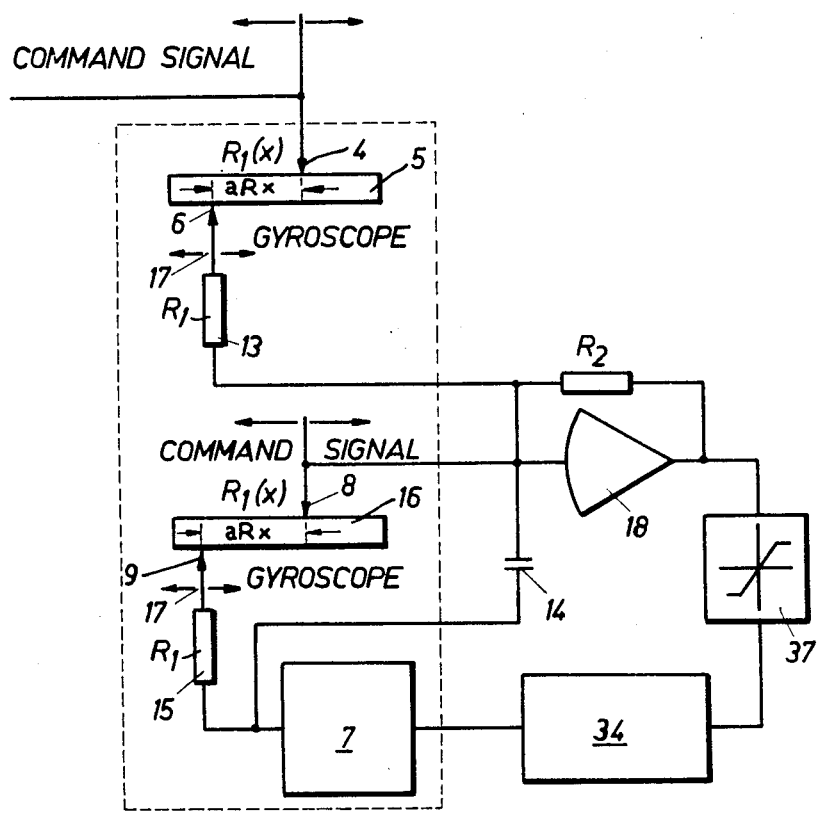
FIG. 6 is a schematic diagram illustrating an embodiment of the invention incorporating a PD regulator.

Referring first to FIG. 1 which illustrates a known PID regulator, an input signal representing the desired position of the aircraft is supplied through the input resistor 31, and another input signal representing the actual position of the aircraft is supplied through a second input resistor 32 to the high gain amplifier 18. An attenuating capacitor 33 is connected in parallel with resistor 32. Output and input of the amplifier 18 are connected by a feedback impedance including a feedback resistor 44 and a feedback capacitor 45. The actual position of the aircraft measured by a gyroscope supported by a gimbal suspension, and represented by a corresponding voltage, is supplied to capacitor 33 and resistor 32. A voltage representing a desired position of the aircraft is supplied under the control of the pilot to resistor 31, and the two voltages are compared. Capacitor 45 produces the integral component, and resistor 44 determines the amount of the amplification. The output of the regulator produces the regulating signal or voltage for operating a control element, such as the elevator foil if a displacement of the aircraft is due to a pitch movement.

The pilot stepwise varies the voltage representing the desired position so that different deviations of the actual position of the aircraft from the desired position may be eliminated.

FIG. 2 illustrates the time required for correcting three different deviations, and it will be seen that substantially the same time is required for moving the aircraft from its actual position to the pilot determined new desired position, irrespective of the angle of displacement between the actual and desired positions. In other words, a small correction will require the same time as a very large correction of the position.

FIG. 3 illustrates by a graph CD the corrected deviation during the regulating time. The condition of an oscillating mass can be represented by the distance of the mass from the origin of the system in the direction of the ordinate, and by the speed of the mass, and the resulting graph is spiral-shaped, as shown in FIG. 3, in which the deviation of the aircraft from the desired position is $x$, and the speed at which the desired position is to be obtained is $dx/dt$. The slanted straight lines bounding an area 16 indicate at which deviations $x$ and associated speeds $dx/dt$, the regulator places the control element, for example the elevator of the aircraft, in an end position engaging a stop.

Referring now to the first embodiment of the invention illustrated in FIGS. 6a and 6, four arcuate resistors 2, 5, 16 and 11 are shown in FIG. 6a. The ends of resistors 2 and 11 are connected to the terminals of a voltage source. A turnable member 1, which may be operated by the pilot, operates three taps, namely a tap 3 movable over resistor 2, a tap 4 movable over resistor 5, and a tap 8 movable over resistor 16. The shaft 17 of a gyroscope 7 turns in accordance with the actual position of the aircraft to move a tap 6 over resistor 5, a tap 9 over resistor 16, and a tap 12 over a resistor 11.

Taps 3 and 4 are connected to each other, tap 8 is directly connected to the input of the amplifier 18, tap 6 is connected over an input resistor 13 with the input of the amplifier, tap 9 is connected over input resistor 15 and capacitor 14 with the input of amplifier 18, and tap 12 is connected to resistor 15 and capacitor 14. A resistor $R_2$ is connected in parallel with amplifier 18. The output of the amplifier 18 is supplied to a setting means 37, such as a servo motor, schematically illustrated in FIG. 6 which also shows the aircraft 34 and the gyroscope 7 in a schematic manner. The reference numerals of FIG. 6a are also applied in FIG. 6 which illustrates the regulating arrangement of FIG. 6a in a schematic manner. The command signal potentiometer 2, 3 is not shown in FIG. 6. Tap 4 is shown in FIG. 6 to move over resistor $R_1(x)$. The gyroscope controlled tap 6 is connected to resistor 13 which is indicated as $R_1$ in FIG. 6. A corresponding circuit is shown in the lower portion of FIG. 6, the variable resistor $R_1(x)$ corresponding to resistor 16, and resistor $R_1$ corresponding to resistor 15 in FIG. 6a. The resistance between taps 6 and 4 on one hand, and between taps 8 and 9 on the other hand is $aR_x$.

The following equation represents the variation of the amplication in the PD regulator shown in FIGS. 6 and 6a.

$$V_R = \frac{V_{R_0}}{1+ax}$$

wherein $V_R$ is a function of $x$ and $V_{R_0}$ is a constant, namely the regulating amplification for $x=0$. The deviation is represented by $x$, and $a$ is a constant representing the resistance gradient of the variable resistor in relation to the deviation $x$. $V_{R_0}$ is the regulator amplification obtained when the deviation $x$ is equal to zero.

A command signal or voltage is produced by turning the regulating means 1 so that tap 3 on resistor 2 divides the voltage on the same in the manner of a potentiometer so that a voltage representing the desired position is applied to tap 4 which turns with regulating means 1. The voltage is then transmitted through resistor 5 to the movable tap 6 which is mechanically connected with the gyroscope shaft 17. If the desired position of the aircraft is the same as the actual position of the aircraft, taps 8 and 9 are located on the same point of the resistor so that the resistance $aR(x)$, see FIG. 6, becomes zero. The voltage is transmitted from tap 6 through resistor 13 to the input of operational amplifier 18 where it is compared with the voltage representing the actual position and produced by the taps controlled by gyroscope shaft 17. This "gyroscope" voltage representing the actual position of the aircraft is obtained by tap 12 on resistor 11, see FIG. 6, and transmitted through capacitor 14 to the input of operational amplifier 18 while a damping signal is produced, and also transmitted through resistor 15 to tap 9 from where the voltage passes through resistor 16 to tap 3 and from there to the input of the operational amplifier 18. Potentiometers 2 and 11 and resistors 5 and 16 are fixedly mounted on the aircraft.

If the deviation is zero, and the taps are located at the same point of the resistor so that the resistance between the taps is zero, as explained above, the regulating amplification of the operator amplifier 18 is $$V_R = R_2/R_1$$

As the distance between the taps is increased, the variable resistance $R_1(x)$ varies proportionally so that the amplification varies in accordance with a hyperbola, as represented by the equation $$V_R = \frac{R_2}{R_1 + R_1(x)}$$

Due to this dependency of the regulator amplification on the deviation of the actual position from the desired position, the narrow area 16 according to the prior art, as shown in FIG. 3, in which the setting means adjusting the position of the control element of the aircraft operates in the linear range, is changed as shown in FIG. 5 which represents the correction of the deviation obtained by the arrangement of the present invention. As is apparent from graph CD of FIG. 5 representing the corrected deviation over the time, the portion of graph CD approaching the origin of the system and zero deviation, is located in the area 16 which represents the limits of the movement of the control element so that overswinging and overcorrection is prevented even if the new desired position substantially deviates from the actual position of the aircraft.

Furthermore, as shown in FIG. 4, the arrangement of the invention required for each correction of a deviation, a time, $t_{s_1}, t_{s_2}, t_{s_3}$ which is proportionate to the angle of the corrected deviations so that small deviations can be corrected within a short time which is not possible by the construction of the prior art, as explained with reference to FIG. 2. Great adjustments require a proportionately longer time, but are made possible by the present invention without over-corrections.

Another advantage of the arrangement of the invention is that the regulating arrangement can be adjusted to a comparatively great amplification for the zero deviation due to the hyperbolic variation of the regulator amplification. Consequently, the remaining deviation in the event of continuous turning moments acting on the aircraft due to a disturbance, such as the failure of one engine, is substantially reduced in the arrangement of the invention.

Figure 7:
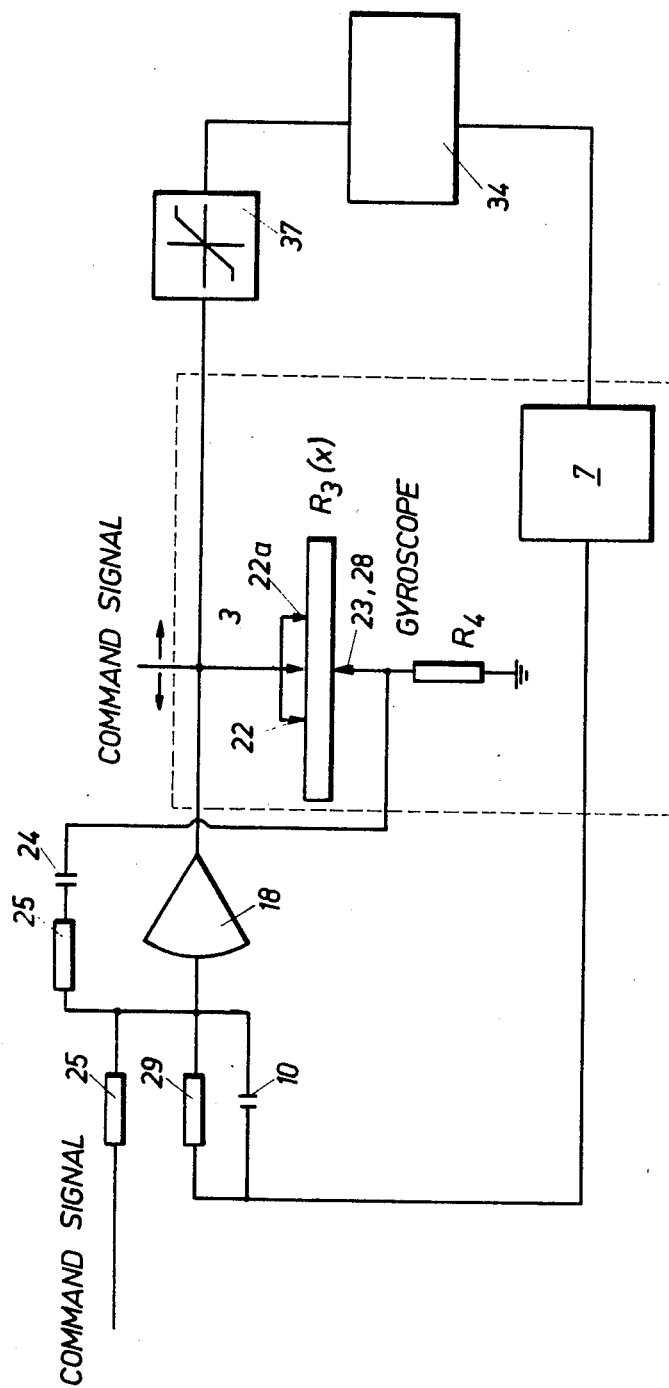
FIG. 7 is a schematic diagram illustrating another embodiment of the invention incorporating a PID regulator.
Figure 7A:
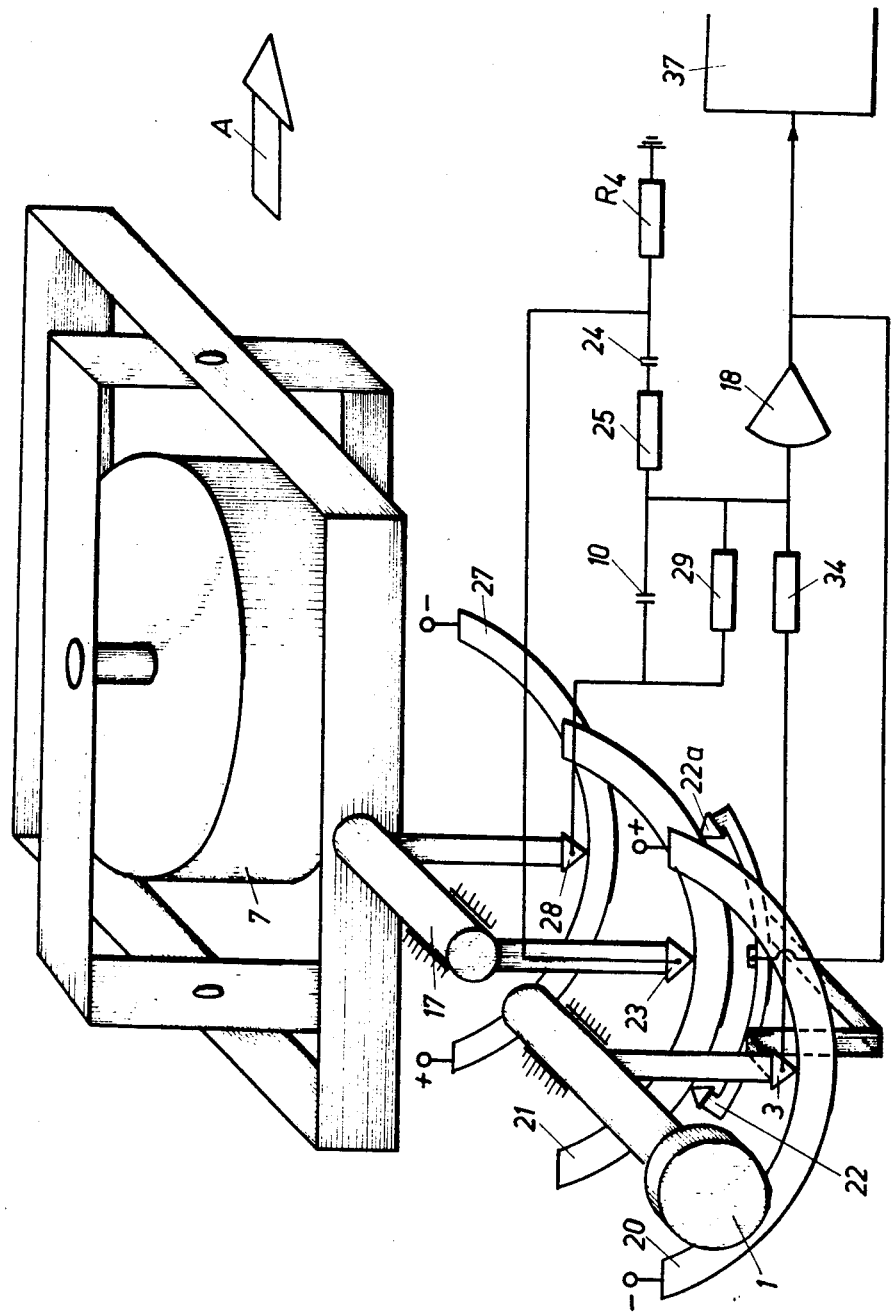
FIG. 7a is partly a perspective view and partly a diagram illustrating the mechanical construction of the embodiment of FIG. 7.

Referring now to the embodiment illustrated in FIGS. 7a and 7 in which the present invention is applied to a PID regulator employing the operational amplifier principle, three arcuate resistors 20, 21, 27 are provided, the ends of resistors 20 and 27 being connected to the terminals of a voltage source. A regulating means 1 is turned for representing the desired position of the aircraft and operates a tap 3 to move the same over resistor 20, and a pair of taps 22 and 22a which engage spaced points of resistor 21 and are connected in parallel to the output of amplifier 18. The shaft 17 of a gyroscope 7 operates two taps 23 and 28 over resistors 21 and 27. Tap 28 is connected over a capacitor 10 and a parallel resistor 29 with the input of amplifier 18 to which tap 3 is connected over resistor 34. A resistor 25 and a capacitor 24 feed the voltage from tap 23 back to the input of amplifier 18. The output of amplifier 18 is connected to the setting means or servo unit 37 by which the position of the aircraft, assumed to fly in the direction of the arrow A, is adjusted.

The command signal representing the desired new position of the aircraft is given by turning regulating means 1 with taps 3, 22, and 22a. A voltage is obtained at tap 3 and supplied through resistor 34 to the input of operational amplifier 18 for comparison with the voltage signal representing the actual position of the aircraft. The momentary pitch position of the aircraft is measured by gyroscope 7 and a corresponding voltage representing the actual position of the aircraft is taken from tap 28 and supplied through resistor 29 and capacitor 10 to the input of operator amplifier 18. A signal representing the actual position is compared with the signal representing the desired position over resistor 34. Capacitor 10 serves for producing the necessary damping according to the D part of the PID regulator principle which is applied in the embodiment of FIGS 7a and 7. In a PID regulator, the variation of the amplification takes place in accordance with the equation $$V_R = V_{R0}(1 - x^2)$$

The output of amplifier 18 is connected with taps 22, 22a which transmit the voltage over resistor 21 to tap 23 so that in accordance with the relative position of taps 22, 22a and 23, a certain voltage drop occurs which varies the amplification of the PID regulator independently of the other parameters. Tap 23 feeds the voltage back to the input of operational amplifier 18 over capacitor 24 and resistor 25. Capacitor 24 serves for producing the integral part of the regulation. The output of the amplifier 18 controls the setting means 37, for example, an electric or hydraulic servo motor which operates an aerodynamic control surface of a conventional airplane, or airbleed nozzles of a satellite or VTOL airplane or satellite.

The reference numerals used in FIG. 7a have been applied also in FIG. 7 which is a schematic representation of the embodiment of FIG. 7a. Resistor 21 is represented by the variable resistor $R_3(x)$. The aircraft is represented by the box 34, and the gyroscope is shown at 7. Due to the particular construction of the double taps 22, 22a, the result is obtained that the variable resistance $R_3(x)$ becomes smaller as the deviation increases. The amplification factor varies in accordance with the parabolic function, as expressed by the equation $$V_R = V_{R0}(1 - x^2)$$

The advantages of the regulating arrangement shown in FIGS. 7 and 7a are the same as explained with reference to the embodiments of FIGS. 6 and 6a except for the compensation for the remaining deviation which, due to the integrating function of the PID regulator, must become zero.

It will be understood that each of the elements described above, or two or more together, may also find a useful application in other types of regulating arrangements for aircraft differing from the types described above.

While the invention has been illustrated and described as embodied in a regulating arrangement for correcting deviations of the position of an aircraft from a desired position and including variable impedances adjusted in accordance with command signals representing a desired position, and also in accordance with the deviation from the desired position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Regulating arrangement for an aircraft, comprising, in combination, setting means for adjusting the position of a control element controlling the position of the aircraft; amplifier means having output means for transmitting a regulating signal to said setting means, and input means; first regulating means adapted to be operated by a pilot and connected with said input means to transmit to the same a command signal representing the desired position of the aircraft; second regulating means responsive to the actual position of the aircraft and connected with said input means to transmit to the same a signal representing the actual position of the aircraft; and impedance means connecting said first and second regulating means and being varied by both said first and second regulating means in accordance with the desired and actual positions of the aircraft whereby regulating signals are produced which cause said setting means to adjust said control element to move the aircraft from said actual position to said desired position within a time period depending on the amount of the deviation of the aircraft from said desired position.

2. Regulating arrangement as claimed in claim 1 wherein said impedance means include input and feedback resistances; wherein said setting means operate substantially within a linear range; and means whereby the amplification of said amplifier means is adjustable to a selected high value in the range of deviations approaching zero so that deviation can be fully compensated.

3. Regulating arrangement as claimed in claim 1 wherein said impedance means includes resistor means variable by said first and second regulating means, and resistors and capacitors connected with the same for controlling the regulating parameters depending on the difference between the desired position and the actual position of the aircraft.

4. Regulating arrangement as claimed in claim 1 wherein said impedance means include input and feedback resistances; wherein said setting means operate substantially within a linear range; wherein the amplification of said amplifier means is adjustable to a selected high value in the range of deviations approaching zero so that the deviation can be fully compensated; wherein said impedance means includes resistor means variable by said first and second regulating means, and resistors and capacitors connected with the same for controlling the regulating parameters depending on the difference between the desired position and the actual position of the aircraft.

5. Regulating arrangement as claimed in claim 1 wherein said impedance means include input and feedback resistances; wherein said setting means operate substantially within a linear range; comprising means whereby the amplification of said amplifier means is adjustable to a selected high value in the range of deviations approaching zero so that the deviation can be fully compensated; wherein said impedance means includes resistors and capacitors for controlling the regulating paramaters depending on the difference between the desired position and the actual position of the aircraft; wherein said impedance means include first input resistor means, and second resistor means connected in series with said first input resistor means; and wherein said first and second regulating means respectively have first and second tap means movable on one of said resistor means, said first tap means being adapted to be moved by the pilot to represent the desired position of the aircraft.

6. Regulating arrangement as claimed in claim 5 wherein said second regulating means includes gyroscope means having a part representing the actual position of theaircraft and being connected with said second tap means for moving the same.

7. Regulating arrangement as claimed in claim 1 comprising a regulator circuit including said amplifier means; wherein said input means of said amplifier means includes constant resistor means and variable resistor means; wherein said first and second regulating means have first and second tap means, respectively, on said variable resistor means; and wherein said first tap means has two taps connected in parallel and spaced from each other along said variable resistor means to contact different portions of the same.

8. Regulating arrangement for an aircraft, comprising, in combination, setting means for adjusting the position of a control element controlling the position of the aircraft; amplifier means having output means for transmitting a regulating signal to said setting means, and input means; first regulating means adapted to be operated by a pilot and connected with said input means to transmit to the same a command signal representing the desired position of the aircraft, said first regulating means including a first movable tap; second regulating means responsive to the actual position of the aircraft and including a second movable tap connected with said input means to transmit to the same a signal representing the actual position of the aircraft; and impedance means including a resistor engaged by said first and second taps and connecting the same, the resistance between said first and second taps being varied by both said first and second taps of said first and second regulating means in accordance with the desired and actual positions of the aircraft whereby regulating signals are produced which cause said setting means to adjust said control element to move the aircraft from said actual position to said desired position within a time period depending on the amount of the deviation of the aircraft from said desired position.

9. Regulating arrangement as claimed in claim 8 wherein said first regulating means includes another first movable tap; wherein said second regulating means includes another second movable tap; and wherein said impedance means include another resistor engaged by said other first and second taps so that the resistance between the same is varied, and a further resistor and a capacitor connecting said other second tap with said input means in series.

10. Regulating arrangement for aircraft, comprising, in combination, setting means for adjusting the position of a control element controlling the position of the aircraft; amplifier means having input means for receiving a command signal representing a desired position of the aircraft and a signal representing the actual position of the aircraft, output means for transmitting a regulating signal to said setting means, and impedance means including first input resistor means and second resistor means connected in series with said first resistor means; first regulating means having first tap means adapted to be moved on said second resistor means by a pilot for varying said impedance means and for transmitting said command signal to said input means; and second regulating means responsive to the actual position of said aircraft from the desired position and having second tap means movable on said second resistor means whereby said first and second tap means vary said impedance means in such a manner that said regulating signals cause said setting means to adjust said control element to said control position within a time period depending on the amount of the deviation.

11. Regulating arrangement as claimed in claim 10 wherein said second regulating means includes gyroscope means having a part representing the actual position of the aircraft and being connected with said second tap means for moving the same.

References Cited

UNITED STATES PATENTS 2,733,878  2/1956  Ciscel _____ 244—77 X
3,018,988  1/1962  Ernst et al.

FOREIGN PATENTS 1,196,968  7/1965  Germany.

FERGUS S. MIDDLETON, *Primary Examiner.*

U.S. Cl. X.R.

244—79